May 11, 1965     D. L. STEPHENS     3,182,626

AMPHIBIOUS TRACKED VEHICLE

Filed June 29, 1961

INVENTOR.
DONALD L. STEPHENS
BY

ATTORNEYS

United States Patent Office 3,182,626
Patented May 11, 1965

3,182,626
AMPHIBIOUS TRACKED VEHICLE
Donald L. Stephens, Renton, Wash., assignor to Pacific Car and Foundry Company, Renton, Wash., a corporation of Washington
Filed June 29, 1961, Ser. No. 120,734
8 Claims. (Cl. 115—1)

This invention relates to amphibious tracked vehicles, and more particularly to an improvement relating to the in-water performance of such a vehicle.

Tracked vehicles water propulsion is usually accomplished by means of the tracks themselves. A significant advantage of such a method of propulsion in an amphibious vehicle is simplicity, precluding as it does need for a different means of applying the drive when operating on land and in the water. Another advantage is that the tracks act on a great amount of water so that large thrusts are developed. However, there is the attendant disadvantage that the upper return run of each track carries water in a direction opposite the direction in which useful thrust is developed so as to impede forward progress of the vehicle. To limit this action shrouds are conventionally employed about the upper track portions. However, since for practical reasons, the space above the track should be relatively deep, and further, since the track itself is also pierced with openings between the shoes and also with openings for sprocket teeth, the shrouds are not completely effective in curtailing this back pumping action.

In view of these difficulties, it is an important object of my invention to provide a vane structure which cooperates with the tracks to not only largely eliminate the adverse effect of back pumping action but also to augment the forward thrust of the vehicle to increase the rate of travel through the water.

It is also an important object of my invention to improve the steering qualities of an amphibious tracked vehicle.

More specifically, my invention purports to improve the steering qualities by (a) decreasing the turning radius of such a vehicle, (b) increasing the turning speed of the vehicle, and (c) improving the course stability of the vehicle, i.e. eliminating the tendency commonly found in such vehicles to skew or to veer off course.

With the above objects and advantages in view, which will each appear and be understood in the course of the following description and claims, the invention consists in the novel construction and in the adaptation and combination of parts hereinafter described and claimed.

Figure 1:
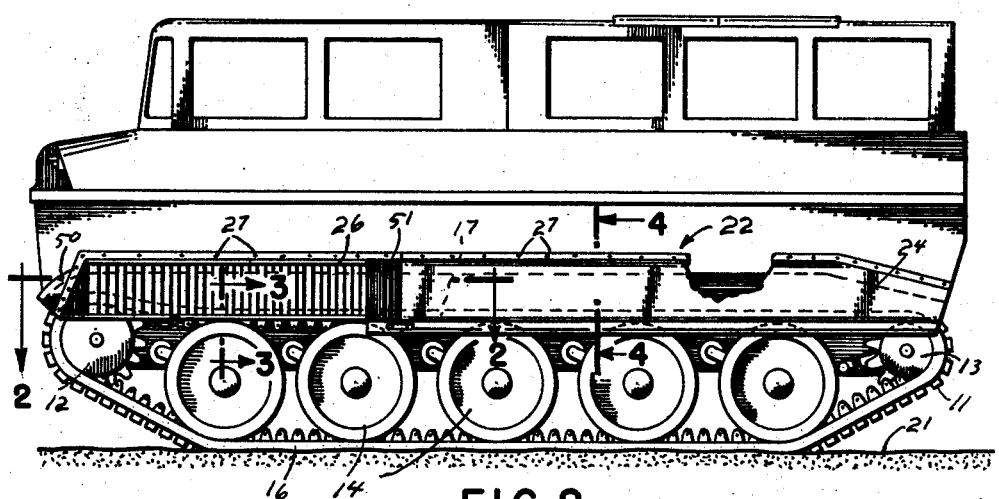
FIGURE 1 is a side elevational view of a vehicle embodying preferred teachings of my invention.
Figure 2:
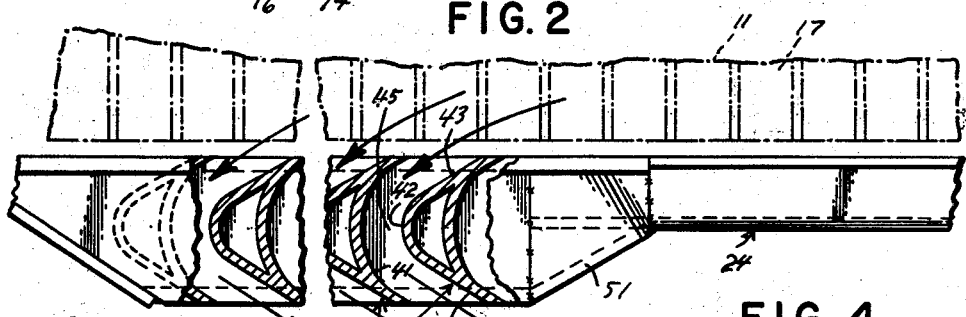
FIG. 2 is a fragmentary horizontal sectional view on line 2—2 of FIG. 1.
Figure 3:
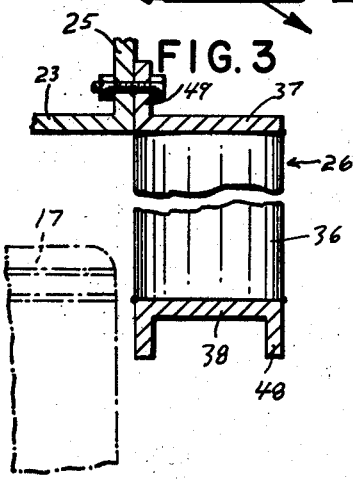
FIG. 3 is a fragmentary transverse vertical sectional view on line 3—3 of FIG. 1.
Figure 4:
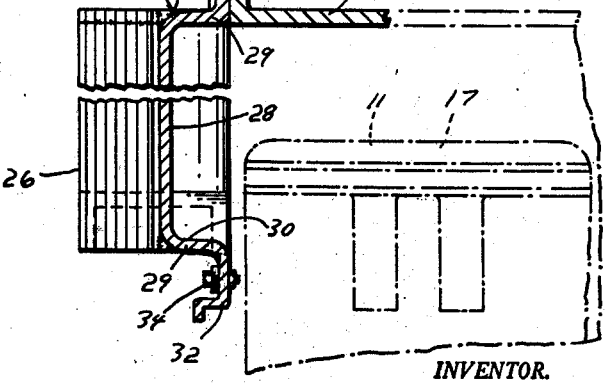
FIG. 4 is a transverse vertical sectional view on line 4—4 of FIG. 1.

Referring to the accompanying drawing, numeral 10 designates generally an amphibious vehicle which for land travel rides on two tracks 11 positioned along opposite sides of the vehicle, and for water travel uses said tracks as a means of propulsion. As is common in the prior art, each track comprises an endless link assembly which rides on sprocket wheels 12 and 13 at, respectively, the extreme forward and rear ends of travel and on a group of bearing wheels 14 disposed in a horizontal row between the sprocket wheels. The track, at any instant of travel, can be described as having a lower horizontal run 16 and an upper horizontal run 17 which together comprise the greater portion of the track.

It should be noted that although in the showing of FIG. 1 the vehicle is on a ground surface 21, the significance of this invention relates to improving the aquatic performance of the vehicle.

Extending the length of the upper track run 17 is an enveloping structure 22, which encloses the exposed top and side of said upper run. The flat top cover is designated 23. The side cover or skirt 24 depends from the outside edge of the top cover and extends along the middle and rear portions thereof. Depending from the outside edge of the forward portion of the top cover 23 and immediately forward of the skirt 24 is a vane structure 26.

To describe this enveloping structure more specifically, the cover 23 is an elongated flat piece extending the length of, and having substantially the same width as, the track 17. Upstanding from the outside edge of the cover is an integral wall or flange 25 to which is bolted at 27 both the skirt 24 and the vane structure 26. It should be noted that the top cover 23 and the upstanding flange 25 are described herein in regard to their function as a cover for the tracks.

The skirt 24 comprises a longitudinal channel-shaped member having a vertical web portion 28 and two inwardly extending horizontal flanges 29 which define a shallow inwardly facing trough 30 therebetween. Two vertical lip members 31 and 32 extend outwardly from the inside edges of flanges 29. The upper lip 31 is the skirt portion which, as indicated before, is bolted (at 27) to the flange 25. The lower lip 32 is bolted at 34 to the rear of the vane structure 26.

The vane structure 26 comprises a plurality of longitudinally spaced vanes 36 which extend vertically between, and are rigidly secured to, a top and bottom cover plate 37 and 38, respectively. Each vane has a front and rear surface 40 and 41 curved in a horizontal plane. The front surface in horizontal section is convexly curved at its center portion 42, with each end of the curve blending into a rearwardly extending tangent surface 43. The arc of the convex curve is somewhat larger than 90°, and the plane of each tangent surface makes an angle of slightly less than 45° with the longitudinal axis. The back surface 41 is in horizontal section curved concavely. The concavo-convex vanes are so arranged with respect to one another that the center about which the arc 42 of the front surface of each one is developed approximately coincides with the center about which the arc is developed which produces the rear surface of the vane which lies to the immediate front thereof, thus giving to the curved passageways 45 which lie between each of the vanes a cross-sectional area which is substantially uniform from one to the other end limit thereof. The entry end of these passageways lies adjacent the outside edge of the top track run 17. The several vanes are desirably made hollow.

The lower cover plate 38 has two longitudinal reinforcing flanges 48 depending from either edge thereof. The upper cover plate 37 has a longitudinal flange 49 upstanding from its inside edge by means of which the vane structure is joined to the top cover 23.

At its extreme front end, the top cover 23 of the shroud or enveloping structure 22 is curved downwardly for a short distance at 50 so as to conform to the curve of the track. At the point where the skirt 24 meets the vane structure 26, the web 28 has welded to its front edge an adapter plate 51 which flares outwardly and merges by its front with the outside rear edge of the vane structure.

In operation, each track moves when in forward in a counterclockwise direction as viewed from a vantage point at the left hand side of the vehicle. Thus the lower run 16 of the track travels rearwardly so as to propel the water rearwardly and respectively create a forward thrust. Water that is entrained in the forwardly moving top run 17 of the track is largely confined within the enclosing structure 22. However, as this entrained water reaches the forward portion of the top run, the water is projected out through the passageways of the vane structure 25. The water ejects itself from these passageways in a rearward and outward direction, and produces therefrom a substantial augmentation of the track's conventional thrust. Steering the vehicle is accomplished by varying the speed of travel of the tracks, one relative to the other.

In actual practice, without the use of the vanes of this invention, the top speed of the water-borne vehicle is 3.93 m.p.h. With the vanes installed, the speed is increased by 13.5% to 4.46 m.p.h. It has been also found that with the vanes installed speed of turning is increased, the turning radius is decreased by 10-15%, and ability to hold course is improved to a major degree.

It is believed that the invention will have been clearly understood from the foregoing detailed description of my now-preferred illustrated embodiment. Changes in the details of construction may be resorted to without departing from the spirit of the invention and it is my intention that no limitations be implied and that the hereto annexed claims be given the broadest interpretation to which the employed language fairly admits.

What I claim is:

1. In an amphibious vehicle employing endless tracks for propulsion at each of the two sides of the vehicle, a vane structure overlying at least a portion of the upper return run of the tracks and so formed as to capture water carried forwardly by said return run, redirect said captured water, and propel the same rearwardly along the sides of the vehicle to augment the propulsion force obtained from the lower run of the track, at least a portion of said water being redirected from a location near the forward portions of said tracks.

2. In an amphibious vehicle having endless track means to supply propulsion to said vehicle for in-water travel wherein said track means has a lower propulsion and an upper return run, a water redirecting means having an entrance located near said upper return run of said track means and made to entrap water from said return run and expel the same in a rearward direction so as to create a forward propelling force ancillary to the propulsion obtained from the lower run of the track means, said redirecting means being such that at least a portion of said water is expelled from a location near the forward portion of said track means.

3. In an amphibious tracked vehicle having two endless tracks on opposite sides of said vehicle, each track having an upper return run and a lower propelling run, water redirecting means having an entrance located adjacent the outside edge of each upper track run, said redirecting means defining a curved passageway structure to redirect water received from said upper run, said redirecting means having an exit to expel said redirected water in a rearward direction, at least a portion of said water being expelled from a location near the forward portions of each of said upper runs.

4. In an amphibious tracked vehicle having two endless tracks on opposite sides of said vehicle, each track having a forward moving upper run and a rearward moving lower run, said tracks supplying in-water motive power to said vehicle, a respective vane structure for each of the two sides of the vehicle, each vane structure comprising a plurality of longitudinally spaced vanes, each vane having a convex front surface and a concave rear surface, the front surface of one vane cooperating with the rear surface of an immediately preceding vane to form a related curved passageway, the entrance to said vane passageway being adjacent the outside edge of said upper run to receive water therefrom, the exit of said passageway being formed to expel water in a rearward direction, at least a portion of each vane structure being located at the forward portion of its related upper run.

5. In an amphibious tracked vehicle having two endless tracks on opposite sides of said vehicle, each track having a forward moving upper run and a rearward moving lower run, said tracks supplying in-water motive power to said vehicle, a respective vane structure for each of the two sides of the vehicle, each vane structure comprising a plurality of longitudinally spaced vanes, each vane having a convex front surface and a concave rear surface, the front surface of one vane cooperating with the rear surface of an immediately preceding vane to form a related curved passageway, the entrance to said vane passageway being adjacent the outside edge of said upper run to receive water therefrom, the exit of said passageway being formed to expel water in a rearward direction, said vanes being located at the forward part of said upper run, and a cover structure extending over the top of said upper run and having a side skirt running along the outside edge of the back part of said upper run.

6. In an amphibious tracked vehicle having two endless tracks on opposite sides of said vehicle, each track having a forward moving upper run and a rearward moving lower run, said tracks supplying in-water motive power to said vehicle, an enveloping structure for each upper track run, each enveloping structure comprising a top cover which extends over said upper track and having to the front of said skirt a side skirt depending from said cover and extending along the outside edge of a back portion of said upper run, and comprising a plurality of vanes arranged in a longitudinal row, each vane being curved in a horizontal plane, each vane having a convex front surface and a concave rear surface, the front surface of one vane cooperating with the rear surface of an immediately preceding vane to form a related curved passageway, the entrance to said vane passageway being adjacent the outside edge of said upper run to receive water therefrom, the exit of said passageway being directed such as to expel water in a rearward direction, said redirecting means being such that at least a portion of said water is expelled from a location near the forward portion of said track means.

7. In an amphibious vehicle having endless track means to supply propulsion to said vehicle for in-water travel wherein said track means has a lower propulsion and an upper return run, a shroud enveloping said upper return run and having water redirecting means, said redirecting means having an entrance located near said upper return run of said track means and made to entrap water from said return run and expel the same in a rearward direction so as to create a forward propelling force ancillary to the propulsion obtained from the lower run of the track means.

8. An amphibious vehicle comprising a hull, a pair of longitudinally spaced wheels rotatably mounted on each side of said hull, an endless track entrained about and extending between each of said pairs of wheels, one of said wheels of each pair thereof being connected to its associated track to drive the latter around said pair of wheels, a plurality of spaced track shoes mounted on each of said tracks and projecting outwardly therefrom; fender means extending longitudinally along each side of said hull and including a fender skirt depending therefrom laterally outboard of said tracks, each of said fender means forming a chamber extending longitudinally along the upper run of each of said tracks, and flow-directing means on each of said fender skirts whereby, upon entry of said vehicle in a body of water submerging said fender means, water pumped in one direction within each of said chambers is directed in the opposite direction by said flow-directing means to aid in propelling said vehicle.

References Cited by the Examiner

UNITED STATES PATENTS

| | | | |
|---|---|---|---|
| 696,666 | 4/02 | Berg | 115—53 |
| 2,165,757 | 7/39 | McLaughlin | 115—53 X |
| 2,408,955 | 10/46 | Reynolds | 115—1 |

MILTON BUCHLER, *Primary Examiner.*